United States Patent [19]

Tschopp et al.

[11] Patent Number: 5,048,439
[45] Date of Patent: Sep. 17, 1991

[54] COMPUTERIZED SEWING MACHINE

[75] Inventors: Gérard Tschopp, Geneva; Claude Buchilly, Vevey; Christian R. Kohli, Thonex, all of Switzerland

[73] Assignee: Mefina S.A., Switzerland

[21] Appl. No.: 550,832

[22] Filed: Jul. 11, 1990

[30] Foreign Application Priority Data

Jul. 11, 1989 [CH] Switzerland ............. 2580/89

[51] Int. Cl.⁵ .............................................. D05B 3/02
[52] U.S. Cl. ................................................... 112/458
[58] Field of Search ............... 112/454, 456, 458, 453, 112/457, 121.12, 103

[56] References Cited

U.S. PATENT DOCUMENTS 4,557,207 12/1985 Turner et al. ............. 112/121.12 X
4,660,488 4/1987 Hanyu et al. ................. 112/456 X
4,942,836 7/1990 Sano et al. ................... 112/458 X

FOREIGN PATENT DOCUMENTS 0147087 8/1988 European Pat. Off. .

Primary Examiner—Peter Nerbun
Attorney, Agent, or Firm—Cushman, Darby & Cushman

[57] ABSTRACT

In a sewing machine, the sewing of letters or signs belonging to different typefaces is enable by individual selection, effected by means of a keyboard of ten keys, followed by selection of the desired typeface by actuation of a respective key. When the selection of a letter or of a sign is programmed by the keyboard, it is possible to choose the typeface desired and the capital or lower case state required for the letter to be sewn, and even to modify this choice several times without having to in any way reprogram the selection of the letter or the sign desired.

4 Claims, 2 Drawing Sheets

COMPUTERIZED SEWING MACHINE

BACKGROUND OF THE INVENTION

1. Field of the Invention

The invention relates to a computerized sewing machine, comprising first means for controlling, on the one hand, alternating axial movement of a sewing needle with a view to making it penetrate into a material to be sewn, and, on the other hand, a loop pick-up device adapted to co-operate with this needle with a view to achieving the formation of a sewing stitch second means for controlling relative displacement of the needle and the material in two orthogonal directions, with a specific amplitude in each direction, at least one electronic memory in which computerized sewing instructions are stored, these instructions corresponding to a plurality of different designs or patterns and being adapted to be read selectively and sequentially to achieve control of said second means, first units for selection of said designs or patterns, a microprocessor adapted to read from the memory sewing instructions corresponding to a design or pattern selected by said first units so as to control as a result, the second means to thus obtain the sewing of the design or pattern selected on said material, a machine in which at least some of the designs or patterns capable of being sewn are formed by letters or signs belonging to at least two alphabets of different types, second units enabling alternate choice of the one or the other alphabet for sewing any letter or sign capable of being selected by the first units.

DESCRIPTION OF THE PRIOR ART

Various sewing machines are already known having all of these characteristics.

This is particularly the case for the machine described in U.S. Pat. Nos. 4,660,488 and 4,413,574.

It is also the case for sewing machines quite recently placed on the market, for example, under the names "Memory Craft 6000" or "Memory Craft 7000" by the Janome Sewing Machine Industry Company, or yet again under the name "Creative 1473 CD" by the German company Pfaff.

These machines certainly allow the carrying-out of the selection of one type of alphabet from a plurality, two or three depending on the case, in particular alphabets the letters of which and the signs which they embody have a different style from alphabet to alphabet, but they suffer from two significant disadvantages, namely even if they allow choice of letters from several available alphabets, they do not offer the possibility of sewing, for all of the styles available, both capital letters and lower case letters, the sewing of a character or sign of the same type successively in different styles requires reexecution of the selection operation for that character or sign prior to any choice of the type of alphabet.

The present invention proposes just such a computerized sewing machine as defined hereinbefore, but one enabling the disadvantages mentioned to be overcome.

BRIEF SUMMARY OF THE INVENTION

According to the invention, there is provided a computerized sewing machine, comprising:

first means for controlling, on the one hand, alternating axial movement of a sewing needle with a view to making it penetrate into a material to be sewn, and on the other hand, a loop pick-up device adapted to co-operate with the needle with a view to achieving the formation of a sewing stitch, second means for controlling relative displacement of the needle and the material in two orthogonal directions, with a specific amplitude in each direction, at least one electronic memory in which computerized sewing instructions are stored, these instructions corresponding to a plurality of different designs or patterns and being adapted to be read selectively and sequentially to achieve control of said second means, first units for selection of said designs or patterns, a microprocessor adapted to read from the memory sewing instructions corresponding to any design or pattern preselected by said first units, controlling as a consequence said second means to thus obtain sewing of the desired design or pattern on said material a machine in which at least some of the designs or patterns capable of being selected are formed by letters and signs belonging to at least two alphabets of different styles, the machine also comprising second units for enabling selection of the type of alphabet with which the letter or the sign selected by the first units is to be sewn, wherein the sewing instructions for the designs of each alphabet are embodied in a specific memory bank, the reference address for the beginning of the memory bank being different for each alphabet, each memory bank comprising an address section, for locating, in the bank, information intended for said second means with a view to effecting sewing of the various signs and letters comprised in the alphabet, the address information being disposed, in said section, in a specific instruction, individual to each letter or sign and identical for each alphabet, the first units comprise a keyboard for selecting, by formation of unique numeric identification codes for the chosen design or pattern, codes assigned to the various signs or letters corresponding to the address information instruction assigned to these letters and signs in the address section of the memory bank of a basic alphabet of said alphabets, the selection units for the type of alphabet desired embody a memory element containing at least a first value, characteristic of the address, in the electronic memory, of the beginning of the memory bank embodying the data for the characters of the basic alphabet, and at least a second value corresponding to the space, in the memory, separating the beginning of said memory bank for the basic alphabet from the beginning of the memory bank embodying the data for the characters of the other alphabet available, means are provided for indicating to the microprocessor the type of alphabet selected, and means are provided for formation of a composite address value by addition of said first value, or this first value and said second value stored in the memory element, depending on the type of alphabet selected and indicated to the microprocessor, to the value of the unique code characteristic of the character selected by the keyboard, this composite address corresponding, in the address section of the memory bank for the alphabet selected, to the address of the part of this section indicating the address of the portion of memory containing the specific instructions for control by the microprocessor of said second means, these instructions being those necessary for sewing the design corresponding to the character desired in the type of alphabet selected.

In a sewing machine according to the invention, the electronic memory may comprise at least four distinct memory banks, the first two of which embody computerized information relating to capital letters and to signs belonging to different alphabets whose designs are of different style from bank to bank, the third and fourth memory banks embodying computerized information relating to lower case letters and to signs the designs of which are of a style identical to that of one of the alphabets of the two first memory banks for the third memory bank, and identical to that of the other alphabet of said two first banks, for the fourth memory bank.

Suitably, the second units comprise, in addition, first means for selection of the type of alphabet desired and second means for selection of capital or lower case characters for the letters of the type of alphabet selected.

Preferably, the means for indicating the type of alphabet selected comprises two first light-emitting diodes associated with the first selection means, one relating to the first alphabet and the other relating to the second alphabet, and a third light-emitting diode associated with the second selection means, the first means enabling alternately effecting illuminating or extinguishing one of the two first diodes simultaneous with extinguishing or illuminating the other diode, and the other means enabling alternately effecting lighting-up or extinguishing of the third diode, and the microprocessor is connected to the supply circuit for the diodes in such a manner as to form, for each of them, a signal characteristic of the value of their supply voltage, the combination of the signals thus derived being characteristic of the type of said first and second selection means actuated and of the mode of their actuation.

BRIEF DESCRIPTION OF THE DRAWINGS

The accompanying drawings show, by way of example, an embodiment of the subject of the present invention.

DETAILED DESCRIPTION OF THE DRAWINGS

Figure 1:
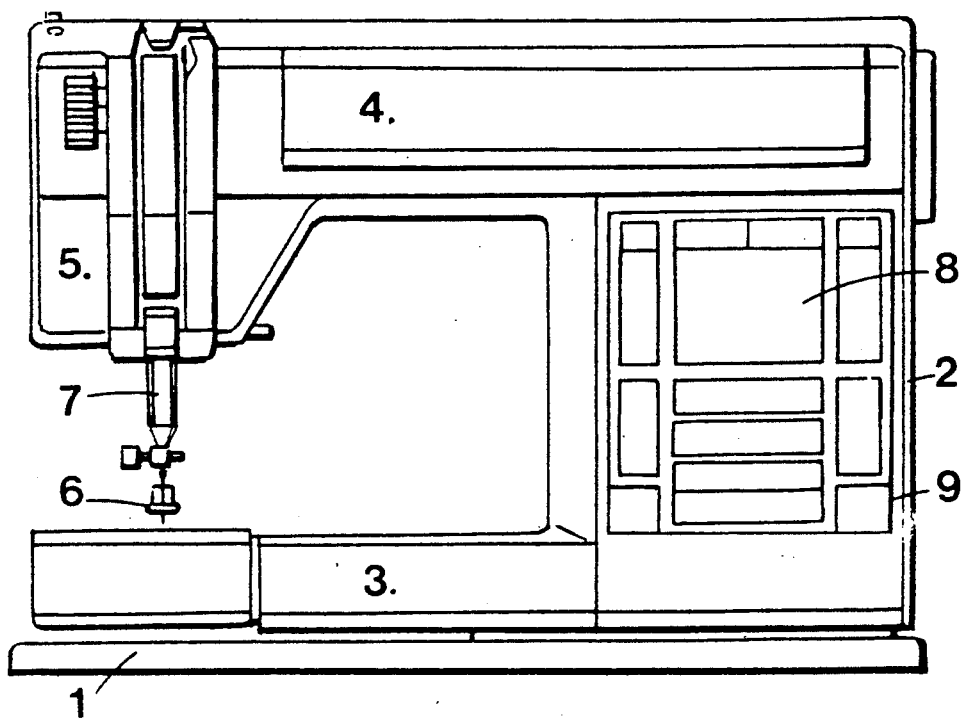
FIG. 1 is a front elevation.

The machine shown in FIG. 1 comprises, in known manner, a base 1 on which there stands a column 2 carrying a free arm 3 and an upper arm 4 at the end of which a sewing head 5 is disposed.

In the free arm there is located a mechanism $M_1$ (FIG. 3) for control of a device for translational feed of the sewing material, schematically represented by rectangle 3A. In this arm, a loop pick-up device, not represented, is also to be found.

In known manner, the loop pick-up device is called upon to co-operate in synchronism with a movable needle 6 fixed at the end of a needle bar 7 driven in a vertical and transversal movement (stitching movement) by a control mechanism $M_2$ (FIG. 3) disposed in the head 5 and in the arm 4.

Figure 2:
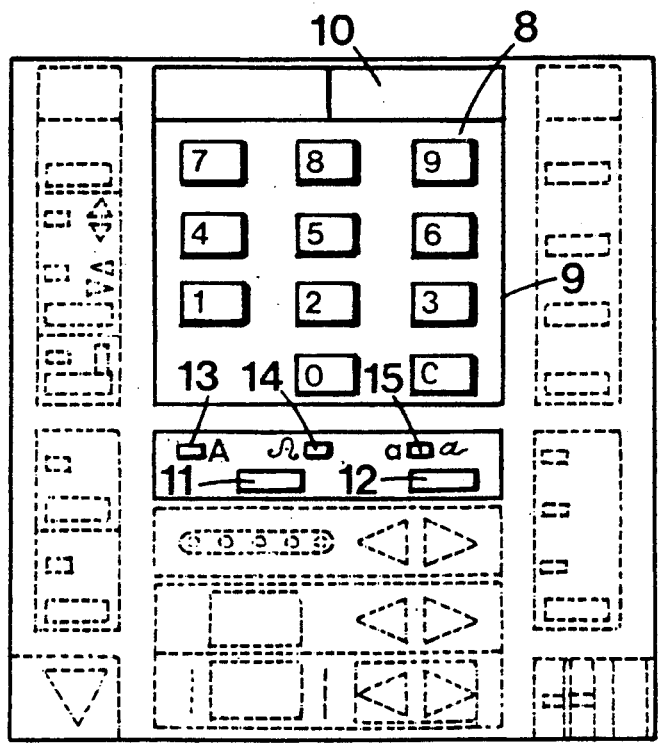
FIG. 2 is a detailed view, to a larger scale than FIG. 1.

The sewing machine shown is a machine controlled by a microprocessor MP (FIG. 3), that is to say, a machine in which the different data for the designs or patterns to be sewn are stored in an electronic memory, ROM or PROM for example (FIG. 4), and may be called upon for execution by the machine of a corresponding design by manual programming using a numeric keyboard 8 comprising ten keys 0 to 9 (FIGS. 1 and 2) as well as a clear key C. the whole being part of a control panel 9 disposed on the front face of the column 2 of the machine.

Such a panel usually comprises a plurality of other control and display keys adapted to allow the activation and/or display of characteristics pertaining to each function and/or their correct sequencing. In the case in question, the displays and the keys relating to the present invention have been depicted in solid line in the drawings, the other elements being outlined in broken line.

The machine shown thus comprises two further keys 11 and 12 on which depend, for key 11, two light-emitting diodes 13 and 14, and a single light-emitting diode 15, for key 12.

Key 11 enables selection of one or the other of two types of alphabet available, either an alphabet embodying letters and signs (for example numbers from 0 to 9 comma, full stop, question mark, exclamation mark, hyphen etc.) present in the form of "block" characters, for example, or a second alphabet in which these same letters and signs are, for example, in italic style.

When it is the first type of alphabet which is selected, diode 13 is lit up and diode 14 extinguished. If the selection is transferred to the alphabet of "italic" characters, diode 14 will be lit up and diode 13 extinguished.

Once selection of the type of characters desired has been carried out, key 12 allows choice of whether the characters and more particularly the letters of the one or the other type of alphabet available should be sewn in capitals or, by contrast, in lower case.

If diode 15 is extinguished, this will signify that the characters chosen will be sewn in capitals; a simple depressing operation exercised on key 12 will cause the machine to sew the characters chosen, and in particular the letters, in lower case. Diode 15 will thus be illuminated.

In this case, it will suffice to actuate, once again, key 12 for the machine to sew the characters, and particularly the letters, in capitals: diode 15 will be extinguished.

When switching on the sewing machine according to the invention, only diode 13 is illuminated, which signifies that the machine will sew any letter selected in "block" characters, in capital form.

According to an essential feature of the present invention, the choice of the character to be sewn, of the style of this character, and particularly for letters, whether or not it is to be sewn in capital or in lower case, is carried out in the following manner:

the first step of the procedure is the introduction, by the keyboard 8, of a digitized code characteristic of the desired character, whether letter or sign, only then are the keys 11 and 12 activated in the manner and for the purposes described above.

It should, at this point, be noted that with the machine according to the invention, the digitized code attributed to each character remains identical whatever the type of alphabet selected and irrespective of whether the letters to be sewn are in capitals or in lower case, the selection carried out by means of the keys 11 and 12 may be modified at will as long as the instruction for sewing has not been given to the machine (that is to say, as long as the user has not acted on the actuator provided for this purpose) without its being necessary to intervene yet again on the keyboard 8 to proceed anew with selection of the character to be sewn.

Figure 3:
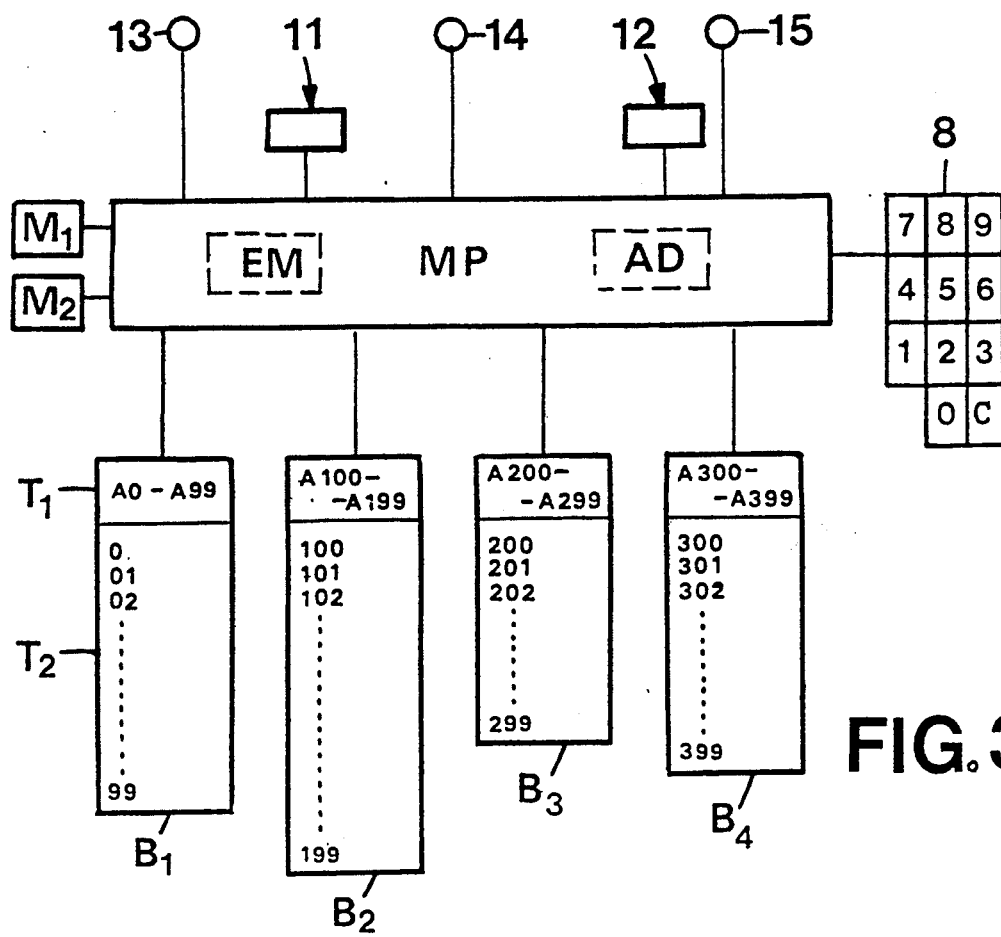
FIG. 3 is a schematic view of certain elements of the computerized part of the machine.
Figure 4:
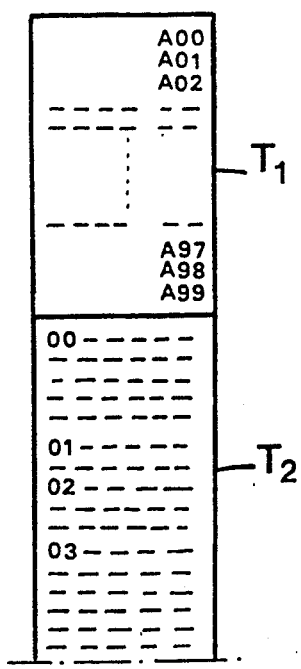
FIG. 4 shows a detail of FIG. 3 to a larger scale.

The foregoing features as well as other characteristics specific to the machine according to the invention will now be illustrated with reference to FIGS. 3 and 4 of the accompanying drawings, in which are to be found the keyboard 8, the keys 11 and 12, as well as the light-emitting diodes 13, 14 and 15, the microprocessor MP, and the mechanisms $M_1$ and $M_2$ previously mentioned.

$B_1$, $B_2$, $B_3$ and $B_4$ are read only memory banks, ROM or PROM for example, containing in particular sewing instructions adapted to be read by the microprocessor MP and based on which, this latter controls the mechanisms $M_1$ and $M_2$ on which the drive of the machine depends.

As may be seen in the drawings, each memory bank $B_1$ to $B_4$ is, in substance, subdivided into two parts, that is, into an address table, $T_1$, and a designs table $T_2$, disposed after the former.

As is well known to the man skilled in the art, the specialised computer professional for modern sewing machines, the table $T_1$ contains, indicated in increasing order, corresponding in the example shown to the numbers 0 to 99, 100 to 199, 200 to 299, and 300 to 399 for the four memory banks, $B_1$, $B_2$, $B_3$ and $B_4$ respectively, the address in the table $T_2$ of the beginning of the section of memory in which the specific sewing instructions for each available design are stored.

As is known, these instructions generally embody a design header in which the microprocessor MP may find various instructions concerning more particularly the management of the different functions of the machine specific to the design in question, such as its speed of sewing, the base length and base width of the design as well as possible variations in length and width, display of the type of foot recommended for sewing the chosen design, etc.

Following this header, the microprocessor will find, for the n stitches of the design, information setting, for each stitch to be sewn, the magnitude of the relative displacement, in two orthogonal directions, of the sewing needle and the material on which the design is to be sewn, for example cloth.

A sewing machine being in question in which the needle bar is fixed to an axially movable bar mounted on an oscillating cradle, this information is the amplitude and the direction of the stitching movement to which the cradle and, as a result, the sewing needle, must be subjected, the amplitude of the step and the direction of transport movement for the material to be sewn.

According to the invention, the sewing instructions for the four types of alphabet available by actuation of the keys 11 and 12 (that is, "block" characters with capital letters, "italic" characters with capital letters, "block" characters with lower case letters, "italic" characters with lower case letters) are disposed in the four memory banks $B_1$ to $B_4$ for which the entry address of the first bank is 00 and the space separating the entry addresses of the three other banks $B_2$, $B_3$ and $B_4$ from the entry address of the first bank is respectively 100, 200 and 300 units. In a variant, this space may, of course, be different for each bank: it will be obvious that the memory banks do not encroach on one another.

According to another essential characteristic of the present invention, the information in the address table $T_1$ as to the address at which there will be found in the corresponding table $T_2$ the computerized instructions for the sewing of each character, will occupy, in the address table $T_1$ of the banks $B_2$, $B_3$ and $B_4$, the same position as in the address table of the memory bank $B_1$, thus the character, the address information for which in the table $T_1$ of memory bank $B_1$ is accessed at position 40 starting from the entry to that table, that is, if the address of this entry is 000 in the memory, at the address 040, will be found in the address table $T_1$ of the memory bank $B_2$ at position 40 in that table, i.e. at the address $(100+40)=140$ of the memory, at the address 240 for the memory bank $B_3$, and at the address 340 for the bank $B_4$.

In the section $T_2$ of the corresponding memory bank, the sewing instructions which will be found at the address provided by the table $T_1$ will also allow sewing the same character in a different style (block or italic) and in capital or lower case depending on the banks.

By way of example, the banks $B_1$ and $B_2$ contain sewing instructions for alphabets with capital letters and "block" and "italic" characters respectively, while the banks $B_3$ and $B_4$ relate to sewing instructions for alphabets with lower case letters and "block" and "italic" characters respectively.

In the drawings, the difference in length of the memory banks $B_1$ and $B_2$ is essentially due to the fact that since the outline of the characters in "italic" is more complex than that of the "block" characters, the sewing instructions for the former will occupy more "memory" space than in the case of the second.

This is furthermore also true, within each memory bank, from character to character: it will be understood for example that the sewing instructions for a letter such as the letter A will be more complex than those relating to the sewing of a sign as simple as a full stop. FIG. 4 shows specifically the difference in memory space occupied by different characters.

According to another essential characteristic of the present invention, the selection of a letter or sign to be sewn, irrespective of type of alphabet, is carried out by formation at the keyboard 8 of unique codes, identical for all the alphabets, characterising the instructions held by the address information for that letter or sign in the table $T_2$ given by the address table $T_1$ of the bank $B_1$, that is to say of the bank containing the sewing instructions for the characters in the alphabet of "block" characters, in capitals. There is in question, as described, a "default" alphabet immediately accessible when the machine is switched on.

By way of example, if the instructions for the "block" characters are memorised at the addresses contained between 25 and 60, it suffices to introduce, at the keyboard 8, the address number for each character, to have the microprocessor access the sewing instructions commencing at that address in the section $T_2$ of the memory bank and proceed with sewing the corresponding design.

For example, the letter A could be selected by introducing the unique code 25, the letter B by the code 26, and so forth. This code will be the same, as indicated, whether it is desired to sew the corresponding character in block capital, in lower case block, in upper case italic or in lower case italic, by corresponding actuation of the keys 11 and 12.

In effect, according to the invention, the microprocessor MP recognizes the type of alphabet selected by the user by examining, at each instant, the state in which the light-emitting diodes 13, 14 and 15 are to be found. The microprocessor may first detect, in known manner, whether a diode is illuminated or extinguished, in particular by monitoring the variations in voltage difference existing at the terminals of the diode, variations which correspond specifically to the illuminated or extinguished state of the diode under consideration.

In the case of the machine described and having regard to the explanations already given above, the information which may be obtained by the microprocessor by monitoring the state of the diodes 13, 14 and 15 is given by the following table in which the letter A corresponds to an illuminated state of a diode and the letter E to an extinguished state.

|  | DIODES | | | | | |
| --- | --- | --- | --- | --- | --- | --- |
|  | 13 | | 14 | | 15 | |
|  | A | E | A | E | A | E | Alphabet selected |
| (a) | X |  | X |  | X |  | "block" capital |
| (b) | X |  |  | X | X |  | "block" lower case |
| (c) |  | X | X |  |  | X | "italic" capital |
| (d) |  | X |  | X | X |  | "italic" lower case |

Based on the results of this investigation, the microprocessor will look for the address at which it will find, for the character selected at the keyboard 8, corresponding sewing instructions in the alphabet chosen, that is to say in the memory bank $B_1$ to $B_4$ pertaining to this alphabet.

Accordingly, the microprocessor contains in particular an elementary memory EM in which there is stored, for each of the four results of the investigation a, b, c, and d indicated in the table above, the value of the space separating the entry of each memory bank $B_1$ to $B_4$ from the entry of the bank $B_1$ which is that of the "default" alphabet, the address instructions of which have been chosen for the unique coding from the keyboard 8.

In the particular case, this space is equal to 0 for the bank $B_1$. It could, of course, be different if it was for example the bank $B_2$ which had been chosen for the "default" alphabet.

In the case of the banks $B_2$, $B_3$ and $B_4$, the value of the space mentioned will be respectively 100, 200 and 300. It could be different if the banks $B_1$ to $B_4$ were to occupy a different position in the memory.

If the investigation by the microprocessor concludes for example at the result c, the microprocessor will take into consideration the space 200 memorised in the memory element EM.

The microprocessor will then proceed, in a cell indicated schematically by the rectangle AD, to add the value of this space, here 200, to that of the coding for the character chosen at the keyboard 8, for example the number 25 for the letter A. The total result, that is 225, will correspond for the microprocessor to the exact location where it will find, in the address table $T_1$ of the bank $B_3$, the value of the address in the table of designs $T_2$ of this bank where the instructions begin corresponding to the sewing of the letter A in lower case letters of "block" style.

If, still by way of example, the investigation by the microprocessor were to finish at result a, the space to be taken into consideration would be nil, so that, still for the letter A, the unique code entered by actuation of keyboard 8 would be 25, and the microprocessor would look for its address at the twenty-fifth item of information in the table of addresses $T_1$ of the bank $B_1$.

Thus, with the sewing machine described, it is in effect possible to dissociate the operation of selection of the character to be sewn from that of the type of alphabet with which this character is to be sewn. In effect, this latter is absolutely independent of the former and may thus be modified at the choice of the user after selection of the desired character, as long as the instruction to sew has not been given to the machine.

Even though in the foregoing description and in the drawings to which it makes reference, there has only been envisaged the case of a sewing machine offering only the possibility of sewing characters, letters, numbers or various signs in two well defined styles ("block" or "italic" characters, in capitals or in lower case), it is obvious that the principles expounded are applicable, mutatis mutandis, to the construction of machines enabling the sewing of characters from any number of groups or sets of characters, greater than two, on condition, of course, of providing, for the user, adequate selection means for each group of characters available so as to give a unique signal for each selection or non-selection of a group, corresponding in particular to that afforded by the diodes 13 to 15 of the embodiment described. For each group of characters, there should correspond a memory bank accessible by the microprocessor in the manner described, depending on unique signals detected.

Such means may for example have a structure similar to that of the selection device described in particular in U.S. Pat. No. 4,005,664.

We claim:

1. A computerized sewing machine comprising:
   first control means for controlling reciprocal axial movement of a sewing needle for penetrating a material to be sewn and a loop pick-up device for cooperating with the needle for forming a sewing stitch;
   second control means for controlling relative displacement of the needle and the material in two orthogonal directions with a specific amplitude in each direction;
   at least one electronic memory in which computerized sewing instructions are stored, said instructions corresponding to a plurality of different designs or patterns, said designs or patterns comprising letters and signs belonging to at least two different styles of alphabet, sewing instructions for the letters and signs of each alphabet being embodied in a specific memory bank, the reference address for the beginning of the memory bank for each alphabet being different;
   first selection means for selecting the letter or the sign to be sewn;
   microprocessor means for reading from said electronic memory sewing instructions corresponding to the design or pattern selected by said first selection means and for controlling the second control means in accordance with said instructions so as to sew the selected design or pattern on said material;
   second selection means for selecting the style of alphabet in which the letter or the sign selected with said first selection means is to be sewn;

each memory bank comprising an address section for locating, within the memory bank, instructions for a particular letter or sign, address information being disposed within said address section in a predetermined order, said address information being individual to each letter or sign and identical for each alphabet;

said first selection means comprising a keyboard for selecting a particular letter or signal by inputting a code corresponding to the address information assigned to that letter or sign in the address section of the memory bank of a default alphabet of said alphabets;

said second selection means comprising a memory element containing at least a first value corresponding to the address of the beginning of the memory bank containing data for the letters and signs of the default alphabet, and at least a second value corresponding to the space in the memory element separating the beginning of the memory bank for the default alphabet from the beginning of the memory bank containing data for the letters and signs of the second alphabet style;

indicator means for indicating to the microprocessor the alphabet style selected by said second selection means;

means for forming a composite address value by adding at least said first value to the value of the code selected by the first keyboard selecting means, said composite address identifying the portion of memory containing specific instructions for controlling said second control means so that the design or pattern corresponding to the letter or sign selected and the alphabet style selected is sewn on the material.

2. A machine according to claim 1, wherein said at least one electronic memory comprises at least four distinct memory banks, the first two memory banks having computerized information relating to capital letters and to signs belonging to different alphabets of different style, the third and fourth memory banks having computerized information relating to lower case letters and to signs of a style identical to that of one of the alphabets of the two first memory banks, for the third memory bank, and identical to that of another alphabet of said two first banks, for the fourth memory bank.

3. A machine according to claim 2, wherein the second selection means comprise, in addition, first means for selection of the type of alphabet desired and second means for selection of one of capital and lower case characters for the letters of the type of alphabet selected.

4. A machine according to claim 3, wherein the means for indicating the alphabet style selected comprises two first light-emitting diodes operatively coupled to the first selection means, one relating to the first alphabet and the other relating to a second alphabet, and a third light-emitting diode operatively coupled to the second selection means, the first selection means enabling alternately effecting illuminating or extinguishing one of the two first diodes simultaneous with extinguishing or illuminating the other of the two first, and the second selection means enabling alternately effecting lighting-up or extinguishing of the third diode, and the microprocessor is connected to a supply circuit for the diodes so as to form, for each diode of them, a signal characteristic of the value of their supply voltage, the combination of the signals thus derived being characteristic of the type of said first and second selection means actuated and of the mode of their actuation.

* * * * *